United States Patent [19]
Kotsubo et al.

[11] Patent Number: 5,731,050
[45] Date of Patent: Mar. 24, 1998

[54] ADHESIVE COMPOSITIONS FOR LIQUID CRYSTAL DISPLAYS

[75] Inventors: Hidefumi Kotsubo; Yasuhiro Morimura, both of Kodaira; Kyouei Yoshida, Tama; Kiyomi Sasaki, Tokorozawa, all of Japan

[73] Assignee: Bridgestone Corporation, Tokyo, Japan

[21] Appl. No.: 600,041

[22] Filed: Feb. 12, 1996

[30] Foreign Application Priority Data

Feb. 14, 1995 [JP] Japan ............................ 7-049187
Feb. 14, 1995 [JP] Japan ............................ 7-049188

[51] Int. Cl.$^6$ .................................................. G02F 1/133
[52] U.S. Cl. ........................................ 428/1; 349/122
[58] Field of Search .......................... 428/1; 349/96, 349/122, 153

[56] References Cited

U.S. PATENT DOCUMENTS 5,334,468  8/1994  Yamasita et al. ................ 430/7
5,422,756  6/1995  Weber ............................. 359/487
5,578,184  11/1996 Imataki et al. ................... 205/118

*Primary Examiner*—Alexander Thomas
*Attorney, Agent, or Firm*—Sughrue, Mion, Zinn, Macpeak & Seas, PLLC

[57] ABSTRACT

An adhesive composition for use in joining a polarizer plate to a substrate of a liquid crystal cell contains as a main component (1) an ethylene-vinyl acetate copolymer, (2) a copolymer of ethylene, vinyl acetate, and an acrylate and/or methacrylate monomer, (3) a copolymer of ethylene, vinyl acetate, and maleic acid and/or maleic anhydride, (4) a copolymer of ethylene, an acrylate and/or methacrylate monomer, and maleic acid and/or maleic anhydride or (5) an ionomer resin in the form of an ethylene-methacrylic acid copolymer having a metal ion for binding molecules thereof. The composition is thermosetting when it contains an organic peroxide. The composition is photo-curable when it contains a photosensitizer.

16 Claims, 1 Drawing Sheet

ADHESIVE COMPOSITIONS FOR LIQUID CRYSTAL DISPLAYS

BACKGROUND OF THE INVENTION

1. Field of the Invention

This invention relates to an adhesive composition for use in the opto-electronic field, especially in the manufacture of liquid crystal displays for joining a substrate and a polarizer plate of a liquid crystal cell.

2. Prior Art

Liquid crystal display (LCD) devices are intended to provide a visible representation by utilizing the response of liquid crystal molecules to an electric field. Commonly used liquid crystal displays include a pair of opposed substrates each having a transparent electrode and an orienting layer on one major surface, with the orienting layers facing each other. A liquid crystal layer intervenes between the opposed orienting layers. A polarizer plate is attached to the other major surface of one substrate. For the bonding of the polarizer plate to the substrate, pressure-sensitive acrylic adhesives are often used as disclosed in Japanese Patent Application Kokai (JP-A) Nos. 195208/1982 and 12471/1991.

Polarizer plates for liquid crystal displays are typically in the form of a polarizing film coated with a protective film on either surface. The protective films used in the prior art include cellulosic films, polyester resin films, acrylic resin films, polycarbonate films, and polyether sulfone films. The front substrates of liquid crystal cells are also made of a variety of materials such as glass, polycarbonates, polyester resins, and polyarylate resins. After a protective film is joined to a substrate, the joint must withstand subsequent treatments and service conditions. The currently used pressure-sensitive acrylic adhesives, however, tend to gradually lose the bonding force as observed in a temperature/humidity accelerated test after formation of a joint because the bonding force depends on the joining pressure. Lifting, separation and bubble inclusion can occur at the joint interface. More particularly, a polarizer plate is integrally joined to a front substrate of a liquid crystal cell. The resulting layered structure then undergoes various treatments where it can be more or less heated, such as formation of a transparent electrode and orienting treatment. In such steps, lifting or interlaminar peeling can occur with the prior art pressure-sensitive acrylic adhesives which are less resistant to heat.

SUMMARY OF THE INVENTION

An object of the present invention is to provide an adhesive composition suitable for use in a liquid crystal display for joining a polarizer plate to a liquid crystal cell substrate which has an increased initial bonding force and forms a durable joint having sufficient heat resistance to withstand heat-entailing treatments.

We have found that a thermosetting or photo-curable adhesive composition comprising as a main component at least one polymer selected from the group consisting of (1) an ethylene-vinyl acetate copolymer, (2) a copolymer of ethylene, vinyl acetate, and an acrylate and/or methacrylate monomer, (3) a copolymer of ethylene, vinyl acetate, and maleic acid and/or maleic anhydride, (4) a copolymer of ethylene, an acrylate and/or methacrylate monomer, and maleic acid and/or maleic anhydride, and (5) an ionomer resin in the form of an ethylene-methacrylic acid copolymer having a metal ion for binding molecules thereof is effective for joining a polarizer plate to a liquid crystal cell substrate. Since this adhesive is a thermosetting or photo-curable adhesive composition containing a highly transparent, durable, stable polymer as a main component, it exerts an increased initial bonding force and forms a durable joint between the polarizer plate and the substrate. Since the adhesive composition is well resistant to heat, the joint fully withstands heat potentially encountered in subsequent treatments. There is thus obtained a liquid crystal cell having a polarizer plate integrally joined to the surface of its substrate.

Therefore, in connection with a liquid crystal display comprising a liquid crystal cell including a substrate having a pair of major surfaces and a liquid crystal layer formed on one major surface of the substrate, with a transparent electrode and an orienting layer interposed therebetween, and a polarizer plate attached to the other major surface of the substrate, the present invention provides an adhesive composition for use in joining the polarizer plate to the substrate. The composition is a thermosetting or photo-curable adhesive composition comprising as a main component at least one polymer selected from the group consisting of (1) an ethylene-vinyl acetate copolymer, (2) a copolymer of ethylene, vinyl acetate, and an acrylate and/or methacrylate monomer, (3) a copolymer of ethylene, vinyl acetate, and maleic acid and/or maleic anhydride, (4) a copolymer of ethylene, an acrylate and/or methacrylate monomer, and maleic acid and/or maleic anhydride, and (5) an ionomer resin in the form of an ethylene-methacrylic acid copolymer having a metal ion for binding molecules thereof.

BRIEF DESCRIPTION OF THE DRAWINGS

These and further features of the present invention will be apparent with reference to the following description and drawings, wherein.

DETAILED DESCRIPTION OF THE INVENTION

Figure 1:
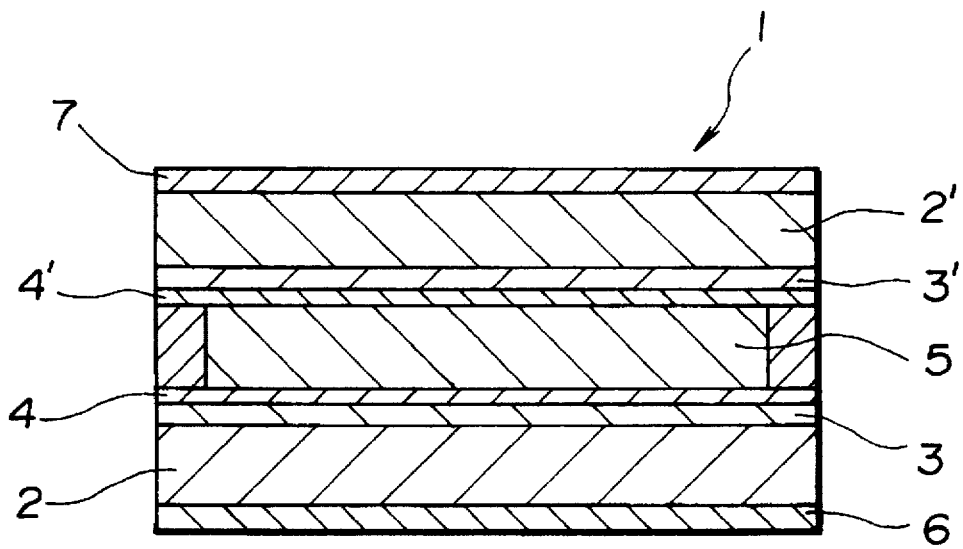
FIG. 1 is a schematic cross-sectional view of one exemplary liquid crystal display.

The adhesive composition of the present invention is a thermosetting or photo-curable adhesive composition comprising a specific polymer as a main component. The polymer is selected from the group consisting of (1) an ethylene-vinyl acetate copolymer, (2) a copolymer of ethylene, vinyl acetate, and an acrylate and/or methacrylate monomer, (3) a copolymer of ethylene, vinyl acetate, and maleic acid and/or maleic anhydride, (4) a copolymer of ethylene, an acrylate and/or methacrylate monomer, and maleic acid and/or maleic anhydride, and (5) an ionomer resin in the form of an ethylene-methacrylic acid copolymer having a metal ion for binding molecules thereof.

In a first form, the polymer is (1) an ethylene-vinyl acetate copolymer which preferably has a vinyl acetate content of 10 to 50% by weight, more preferably 14 to 45% by weight. With a vinyl acetate content of less than 10%, an adhesive composition as cured would be unsatisfactory in transparency and optical uniformity. With a vinyl acetate content of more than 50%, an adhesive composition would be satisfactory in transparency and optical uniformity, but form an adhesive layer having substantially reduced strength and durability.

In a second form, the polymer is (2) a copolymer of ethylene, vinyl acetate, and an acrylate and/or methacrylate monomer. Preferably, the copolymer has a vinyl acetate content of 10 to 50% by weight, more preferably 14 to 45% by weight. With a vinyl acetate content of less than 10%, an adhesive composition as cured would be unsatisfactory in transparency and optical uniformity. With a vinyl acetate content of more than 50%, an adhesive composition would be satisfactory in transparency and optical uniformity, but form an adhesive layer having substantially reduced strength and durability. Also preferably, the copolymer has an acrylate and/or methacrylate monomer content of 0.01 to 10% by weight, more preferably 0.05 to 5% by weight. A monomer content of less than 0.01% would achieve less improvement in bonding force whereas a monomer content of more than 10% would detract from processability.

The acrylate and methacrylate monomers which can be used herein are acrylic and methacrylic acid ester monomers, preferably esters of acrylic and methacrylic acid with substituted or unsubstituted aliphatic alcohols having 1 to 20 carbon atoms, especially 1 to 18 carbon atoms (the substituent, if any, is an epoxy group, for example), for example, such as methyl acrylate, methyl methacrylate, ethyl acrylate, ethyl methacrylate, and glycidyl methacrylate.

In a third form, the polymer is (3) a copolymer of ethylene, vinyl acetate, and maleic acid and/or maleic anhydride. Preferably, the copolymer has a vinyl acetate content of 10 to 50% by weight, more preferably 14 to 45% by weight. With a vinyl acetate content of less than 10%, an adhesive composition as cured would be unsatisfactory in transparency and optical uniformity. With a vinyl acetate content of more than 50%, an adhesive composition would be satisfactory in transparency and optical uniformity, but form an adhesive layer having substantially reduced strength and durability. Also preferably, the copolymer has a maleic acid and/or maleic anhydride content of 0.01 to 10% by weight, more preferably 0.05 to 5% by weight. A maleic content of less than 0.01% would achieve less improvement in bonding force whereas a maleic content of more than 10% would detract from processability.

In a fourth form, the polymer is (4) a copolymer of ethylene, an acrylate and/or methacrylate monomer, and maleic acid and/or maleic anhydride. Preferably, the copolymer has a (meth)acrylate content of 10 to 50% by weight, more preferably 14 to 45% by weight. With a (meth)acrylate content of less than 10%, an adhesive composition as cured would be unsatisfactory in transparency and optical uniformity. With a (meth)acrylate content of more than 50%, an adhesive composition would be satisfactory in transparency and optical uniformity, but form an adhesive layer having substantially reduced strength and durability. It is understood that the (meth)acrylate monomers used herein are the same as mentioned for copolymer (2). Also preferably, the copolymer has a maleic acid and/or maleic anhydride content of 0.01 to 10% by weight, more preferably 0.05 to 5% by weight. A maleic content of less than 0.01% would achieve less improvement in bonding force whereas a maleic content of more than 10% would detract from processability.

In a fifth form, the polymer is (5) an ionomer resin in the form of an ethylene-methacrylic acid copolymer having a metal ion for binding molecules thereof. Preferably, the ethylene-methacrylic acid ionomer resin has a methacrylic acid content of 1 to 30% by weight, more preferably 5 to 25% by weight. An ionomer resin with a methacrylic acid content of less than 1% would exert less ionic crosslinking effect and lose bonding force. A methacrylic acid content of more than 30% would detract from processability.

The metal ions which can be used in the ionomer resin are sodium, zinc, magnesium, lithium, and other metal ions. The ionomer resin preferably has a degree of ionization by the metal ion of 5 to 80%, more preferably 7 to 70%. A degree of ionization of less than 5% would lead to a substantial loss of transparency whereas a degree of ionization of more than 80% would detract from processability.

In a first aspect, the adhesive composition of the invention is thermosetting. An organic peroxide is added to the composition. It may be any of organic peroxides which decompose at a temperature of 70° C. or higher to generate radicals, preferably organic peroxides having a decomposition temperature affording a half life of 10 hours of 50° C. or higher. A choice may be made while taking into account a film forming temperature, crosslinking temperature, and shelf stability.

Examples of the peroxide which can be used herein include 2.5-diemethylhexane-2,5-dihydroperoxide, 2,5-dimethyl-2,5-di(t-butylperoxy)hexine-3, di-t-butyl peroxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butyl peroxybenzoate, benzoyl peroxide, t-butyl peroxyacetate, 1,1-bis(t-butylperoxy)-3,3,5-trimethylcyclohexane, 1,1-bis(t-butylperoxy)cyclohexane, methyl ethyl ketone peroxide, t-butyl hydroperoxide, p-menthane hydroperoxide, hydroxylbutyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, benzoyl peroxide, t-butylperoxyisobutyrate, and 2,4-dichlorobenzoyl peroxide.

The organic peroxides may be used alone or in admixture of two or more in amounts of 0.1 to 10 parts by weight per 100 parts by weight of the polymer.

In a second aspect, the adhesive composition of the invention is photo-curable. A photosensitizer is added to the composition. Examples of the photosensitizer which can be used herein include benzoin, benzophenone, benzoin methyl ether, benzoin ethyl ether, benzoin isopropyl ether, benzoin isobutyl ether, dibenzyl, 5-nitroacenaphthene, hexachlorocyclopentadiene, para-nitrodiphenyl, para-nitroaniline, 2,4,6-trinitroaniline, 1,2-benzanthraquinone, and 3-methyl-1,3-diaza-1,9-benzanthrone. The photosensitizers may be used alone or in admixture of two or more in amounts of 0.1 to 10 parts by weight per 100 parts by weight of the polymer.

The following description applies to the adhesive composition of the invention independent of whether it is thermosetting or photo-curable, unless otherwise stated.

A silane coupling agent may be added to the adhesive composition as an adhesion promoter. Examples of the silane coupling agent which can be used herein include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, and N-β-(aminoethyl)-γ-aminopropyltrimethoxysilane. The silane coupling agents may be used alone or in admixture of two or more in amounts of 0.01 to 5 parts by weight per 100 parts by weight of the polymer.

For the purpose of improving or adjusting various properties of the adhesive composition of the invention including mechanical strength, optical properties, adhesiveness, heat resistance, hot moisture resistance, weather resistance and crosslinking rate, an acryloxy group-containing compound, a methacryloxy group-containing compound or an allyl group-containing compound may be added to the adhesive composition.

The compounds which can be used for this purpose are generally derivatives of acrylic acid and methacrylic acid, for example, esters and amides thereof. Exemplary ester residues are alkyl groups such as methyl, ethyl, dodecyl, strearyl, and lauryl as well as cyclohexyl, tetrahydrofurfuryl, aminoethyl, 2-hydroxyethyl, 3-hydroxypropyl, and 3-chloro-2-hydroxypropyl groups. Also useful are esters of acrylic acid and methacrylic acid with polyfunctional alcohols such as ethylene glycol, triethylene glycol, polyethylene glycol, glycerine, trimethylol propane, and pentaerythritol. Acryl amides are typical amides. Examples of the allyl group-containing compound include triallyl cyanurate, triallyl isocyanurate, diallyl phthalate, diallyl isophthalate, and diallyl maleate. These compounds may be used alone or in admixture of two or more in amounts of 0.1 to 50 parts by weight, preferably 0.5 to 30 parts by weight per 100 parts by weight of the polymer. More than 50 parts of the compound would detract from the ease of preparation of an adhesive composition and its film forming ability. Less than 0.1 part of the compound would be ineffective for improving mechanical strength.

For the purpose of improving processability and workability (or ease of application), a hydrocarbon resin may be added to the adhesive composition of the invention. The hydrocarbon resin used herein may be either naturally occurring or synthetic. Preferred natural resins include rosin, rosin derivatives, and terpene resins. Gum resins, tall oil resins and wood resins may be used as the rosin. Useful rosin derivatives are hydrogenated, disproportionated, polymerized, and esterified products of rosin as well as metal salts of rosin. The terpene resins include terpene resins such as α-pinene and β-pinene and terpene-phenol resins. Other useful natural resins are dammar, copal, and shellac. As to the synthetic resin, petroleum resins, phenolic resin, and xylenic resins are preferably used. The petroleum resins include aliphatic petroleum resins, aromatic petroleum resins, alicyclic petroleum resins, copolymeric petroleum resins, hydrogenated petroleum resins, pure monomeric petroleum resins, and coumarone-indene resins. The phenolic resins include alkyl phenol resins and modified phenolic resins. The xylenic resins include xylene resins and modified xylene resins.

The hydrocarbon resin may be added in any desired amount, preferably 1 to 200 parts by weight, more preferably 5 to 150 parts by weight per 100 parts by weight of the polymer.

In addition to the above-mentioned additives, the adhesive composition of the invention may further contain minor amounts of UV absorbing agents, antioxidants, dyes, and processing aids. If desired, a particulate additive such as fine particles of silica gel, calcium carbonate and silicone copolymers may be blended in minor amounts.

The adhesive composition of the invention is prepared by uniformly mixing the polymer with selected ones of the above-mentioned additives and milling the mixture in an extruder or roll mill. On use, the composition may be formed into a suitable film shape by conventional sheeting methods such as calendering, rolling, T-die extrusion, and inflation. While the composition is formed into a film, the film may be embossed for the purposes of preventing blocking and allowing easy escape of air bubbles upon pressure juncture to a liquid crystal cell and a polarizer protective film. Alternatively, the polymer and selected ones of the above-mentioned additives are uniformly dissolved in a solvent which does not affect a protective film and front substrate of a liquid crystal cell. The solution is then uniformed applied to the film or substrate surface. In this way, the polarizer plate and the substrate are joined via the adhesive layer, which is cured by heating or exposure to light.

The adhesive composition of the invention is used in a liquid crystal display. Referring to FIG. 1, there is illustrated in cross-section a liquid crystal display comprising a pair of substrates 2 and 2' each having a transparent electrode 3, 3' and an orienting layer 4, 4' on one major surface thereof. The substrates 2 and 2' are mated such that the orienting layers 4 and 4' face each other. A liquid crystal layer 5 intervenes between the opposed substrates 2 and 2', more specifically between the opposed orienting layers 4 and 4'. A polarizer plate 6 is attached to the other major surface (lower surface in the figure) of one substrate 2. An analyzer plate 7 is attached to the other major surface (upper surface in the figure) of the other substrate 2'. The adhesive composition is used in joining the polarizer plate 6 to the substrate 2.

Figure 2:
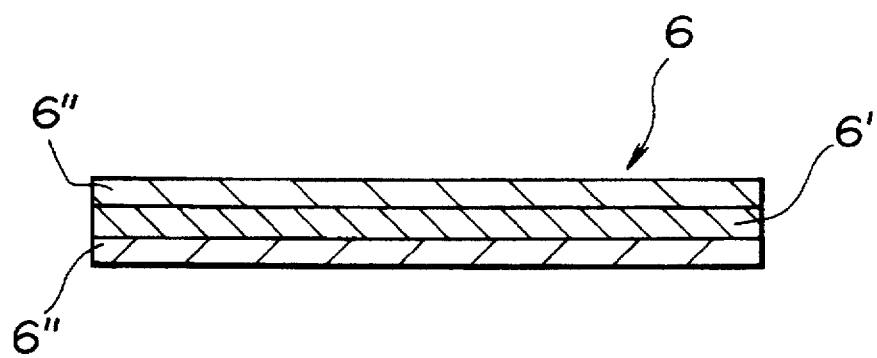
FIG. 2 is a schematic cross-sectional view of one exemplary polarizer plate.

More particularly, as shown in FIG. 2, the polarizer plate 6 includes a polarizing film 6' and protective films 6" and 6" covering the opposite surfaces thereof. Therefore, exactly speaking, the adhesive composition is used in joining the protective film 6" of the polarizer plate 6 to the substrate 2. It is understood that after a joint is completed with the adhesive composition, a liquid crystal display is fabricated in a conventional manner as by forming a transparent electrode on a surface of the substrate and carrying out alignment treatment.

The type of the substrate may be suitably selected from, for example, glass, polycarbonate, polyester resins, polyarylate resins, and polyether sulfone resins. The protective film of the polarizer to be joined to the substrate may be selected from cellulosic films, polyester films, polyacrylic resin films, polycarbonate films, and polyether sulfone films.

Curing differs whether the adhesive composition of the invention is thermosetting or photo-curable. In the case of the thermosetting adhesive composition, preferred curing conditions include a temperature of about 70° to 170° C., especially about 70° to 150° C. and a time of about 2 to 60 minutes, especially about 5 to 30 minutes although they depend on the type of organic peroxide used. It is recommended to carry out curing under a pressure of about 0.01 to 50 kgf/cm$^2$, especially about 0.1 to 20 kgf/cm$^2$.

The photo-curable adhesive composition can be cured by irradiating UV radiation to a layer structure from a suitable light source such as mercury lamps. For promoted curing, the layer structure may be preheated to about 40° to 120° C. before UV irradiation. The recommended process involves interleaving the adhesive composition between the protective film of the polarizer plate and the substrate, heat pressing the layer structure at a temperature of about 50° to 120° C., especially about 70° to 100° C. and a pressure of about 0.01 to 20 kgf/cm$^2$, especially about 0.1 to 10 kgf/cm$^2$ and then irradiating light for curing. The dose of UV radiation is preferably over 1.0 μW/cm$^2$ though not limited thereto.

There has been described a thermosetting or photo-curable adhesive composition comprising a specific polymer of (1) to (5) as a main component. Due to the nature of the main component, the composition is highly transparent and weatherable. In the embodiment wherein an organic peroxide or photosensitizer and an optional additive in the form of an acryloxy, methacryloxy or allyl group-containing compound are blended to provide a crosslinked structure, improvements are made in heat resistance, resistance to hot humidity, and transparency. In the embodiment wherein a silane coupling agent is blended to improve adhesiveness upon curing, an initial bonding force and a thermally stable bonding force are observed. By virtue of these advantages, the adhesive composition of the invention is outstandingly improved in reliability of heat resistance and other properties over conventional pressure-sensitive acrylic adhesive compositions. When a layered structure of a liquid crystal cell having a polarizer plate integrally bonded to a front substrate is subjected on its substrate surface to treatments where the structure can be heated, for example, formation of a transparent electrode and alignment treatment, the conventional pressure-sensitive acrylic adhesive compositions undesirably allow separation to occur at the joint interface because their heat resistance is low. By using the adhesive composition of the invention, it becomes possible that the liquid crystal cell front substrate having a polarizer plate integrally bonded thereto withstand the heat of subsequent treatments.

EXAMPLE

Examples of the present invention are given below by way of illustration and not by way of limitation. Unless otherwise stated, all parts and percents are by weight.

Example 1

With 100 parts of an ethylene-vinyl acetate copolymer (EVA) (Ultrathene 760, Toso K.K., vinyl acetate content 42%) were mixed 2.0 parts of benzoyl peroxide (Niper B, Nihon Yusi K.K.), 0.5 part of γ-methacryloxypropyltrimethoxysilane (KBM 503, Shin-Etsu Silicone K.K.), and 2.0 parts of triallyl isocyanurate (TAIC, Nihon Chemicals K.K.). The mixture was homogeneously dissolved in toluene to form a solution having a resin concentration of 20% by weight. The solution was evenly coated onto a triacetate film by means of a roll coater and dried. The coated film was attached to a polycarbonate film under a pressure of 0.5 kgf/cm² while deaerating. The film laminate was then heated in an oven at 100° C. for 30 minutes, obtaining a laminate A.

Example 2

A laminate B was prepared as in Example 1 except that glass was used instead of the polycarbonate film.

Example 3

A laminate C was prepared as in Example 1 except that a polyester film was used instead of the triacetate film and glass was used instead of the polycarbonate film.

Comparative Example

A pressure-sensitive acrylic adhesive was obtained by polymerizing a blend of 95 parts of ethyl acrylate and 5 parts of acrylic acid in toluene and adding 1 part of polyisocyanate thereto. The adhesive solution was evenly coated onto a triacetate film by means of a roll coater and dried. The coated film was attached to a polycarbonate film under a pressure of 0.5 kgf/cm² while deaerating, obtaining a laminate D.

The laminates of Examples 1–3 and Comparative Example were subject to a 180° peel test under varying temperature conditions. The results are shown in Table 1.

TABLE 1

| Bonding force (kgf/25 mm) | Example | | | Comparative Example |
|---|---|---|---|---|
| | 1 | 2 | 3 | |
| at 25° C. | 4.5 | 4.0 | 3.2 | 2.0 |
| at 70° C. | 4.2 | 3.9 | 2.5 | 0.2 |

Example 4

With 100 parts of an ethylene-vinyl acetate-glycidyl methacrylate copolymer (Bondfast 2A, Sumitomo Chemical K.K., vinyl acetate content 8%, glycidyl methacrylate content 3%) were mixed 2.0 parts of benzoyl peroxide (Niper B, Nihon Yusi K.K.), 0.5 part of γ-methacryloxypropyltrimethoxysilane (KBM 503, Shin-Etsu Silicone K.K.), and 2.0 parts of triallyl isocyanurate (TAIC, Nihon Chemicals K.K.). The mixture was homogeneously dissolved in toluene to form a solution having a resin concentration of 20% by weight. The solution was evenly coated onto a triacetate film by means of a roll coater and dried. The coated film was attached to a polycarbonate film under a pressure of 0.5 kgf/cm² while deaerating. The film laminate was then heated in an oven at 100° C. for 30 minutes, obtaining a laminate A.

Example 5

A laminate B was prepared as in Example 4 except that glass was used instead of the polycarbonate film.

Example 6

A laminate C was prepared as in Example 4 except that a polyester film was used instead of the triacetate film and glass was used instead of the polycarbonate film.

The laminates of Examples 4–6 were subject to a 180° peel test under varying temperature conditions. The results are shown in Table 2.

TABLE 2

| Bonding force (kgf/25 mm) | Example | | | Comparative Example |
|---|---|---|---|---|
| | 4 | 5 | 6 | |
| at 25° C. | 4.2 | 4.0 | 3.2 | 2.0 |
| at 70° C. | 3.2 | 3.5 | 2.5 | 0.2 |

Example 7

With 100 parts of an ethylene-vinyl acetate-maleic anhydride copolymer (MODIC-E-100H, Mitsubishi Chemical K.K., vinyl acetate content about 20%, maleic anhydride content about 0.5%) were mixed 2.0 parts of 1,1-bis(t-butylperoxy)-3,3,5-trimethylcyclohexane (Perhexa 3M, Nihon Yusi K.K.), 0.5 part of γ-methacryloxypropyltrimethoxysilane, and 1.0 part of triallyl isocyanurate. The blend was milled in a roll mill at 80° C. and calendered into a film of 100 μm thick. The film was sandwiched between a triacetate film and a polycarbonate film. While deaerating in a vacuum bag, the sandwich was heated in an oven at 130° C. for 10 minutes, obtaining a laminate A.

Example 8

A laminate B was prepared as in Example 7 except that glass was used instead of the polycarbonate film.

Example 9

A laminate C was prepared as in Example 7 except that a polyester film was used instead of the triacetate film and glass was used instead of the polycarbonate film.

The laminates of Examples 7–9 were subject to a 180° peel test under varying temperature conditions. The results are shown in Table 3.

TABLE 3

| Bonding force | Example | | | Comparative |
|---|---|---|---|---|
| (kgf/25 mm) | 7 | 8 | 9 | Example |
| at 25° C. | 4.5 | 4.0 | 3.2 | 2.0 |
| at 70° C. | 4.1 | 3.8 | 2.5 | 0.2 |

Example 10

With 100 parts of an ethylene-ethyl acrylate-maleic anhydride copolymer (LX4110, Sumitomo Chemical K.K., ethylene content 91%, ethyl acrylate content 8%, maleic anhydride content 1%) were mixed 2.0 parts of 1,1-bis(t-butylperoxy)-3,3,5-trimethylcyclohexane (Perhexa 3M, Nihon Yusi K.K.), 0.5 part of γ-methacryloxypropyltrimethoxysilane, and 1.0 part of triallyl isocyanurate. The blend was milled in a roll mill at 80° C. and calendered into a film of 100 μm thick. The film was sandwiched between a triacetate film and a polycarbonate film. While deaerating in a vacuum bag, the sandwich was heated in an oven at 130° C. for 10 minutes, obtaining a laminate A.

Example 11

A laminate B was prepared as in Example 10 except that glass was used instead of the polycarbonate film.

Example 12

A laminate C was prepared as in Example 10 except that a polyester film was used instead of the triacetate film and glass was used instead of the polycarbonate film.

The laminates of Examples 10–12 were subject to a 180° peel test under varying temperature conditions. The results are shown in Table 4.

TABLE 4

| Bonding force | Example | | | Comparative |
|---|---|---|---|---|
| (kgf/25 mm) | 10 | 11 | 12 | Example |
| at 25° C. | 4.5 | 4.0 | 3.2 | 2.0 |
| at 70° C. | 4.1 | 3.8 | 2.5 | 0.2 |

Example 13

With 100 parts of an ethylene-methacrylic acid ionomer resin of sodium ion type (Himilan 1856, Mitsui duPont Polychemical K.K., methacrylic acid content 5%, degree of ionization by sodium ion 40%) were mixed 2.0 parts of 1,1-bis(t-butylperoxy)-3,3,5-trimethylcyclohexane (Perhexa 3M, Nihon Yusi K.K.), 0.5 part of γ-methacryloxypropyltrimethoxysilane, and 1.0 part of triallyl isocyanurate. The blend was milled in a roll mill at 80° C. and calendered into a film of 100 μm thick. The film was sandwiched between a triacetate film and a polycarbonate film. While deaerating in a vacuum bag, the sandwich was heated in an oven at 130° C. for 10 minutes, obtaining a laminate A.

Example 14

A laminate B was prepared as in Example 13 except that glass was used instead of the polycarbonate film.

Example 15

A laminate C was prepared as in Example 13 except that a polyester film was used instead of the triacetate film and glass was used instead of the polycarbonate film.

The laminates of Examples 13–15 were subject to a 180° peel test under varying temperature conditions. The results are shown in Table 5.

TABLE 5

| Bonding force | Example | | | Comparative |
|---|---|---|---|---|
| (kgf/25 mm) | 13 | 14 | 15 | Example |
| at 25° C. | 4.5 | 4.0 | 3.2 | 2.0 |
| at 70° C. | 4.2 | 3.9 | 2.6 | 0.2 |

Example 16

With 100 parts of an ethylene-vinyl acetate copolymer (EVA) (Ultrathene 760, Toso K.K., vinyl acetate content 42%) were mixed 2.0 parts of benzoyl isopropyl ether, 0.5 part of γ-methacryloxypropyltrimethoxysilane (KBM 503, Shin-Etsu Silicone K.K.), and 2.0 parts of triallyl isocyanurate (TAIC, Nihon Chemicals K.K.). The mixture was homogeneously dissolved in toluene to form a solution having a resin concentration of 20% by weight. The solution was evenly coated onto a triacetate film by means of a roll coater and dried. The coated film was attached to a polycarbonate film under pressure while deaerating. Using a high-pressure mercury lamp of 4 kW, the film laminate was then exposed to UV for 30 seconds on each surface, 1 minute in total, obtaining a laminate A.

Example 17

A laminate B was prepared as in Example 16 except that glass was used instead of the polycarbonate film.

Example 18

A laminate C was prepared as in Example 16 except that a polyester film was used instead of the triacetate film and glass was used instead of the polycarbonate film.

The laminates of Examples 16–18 were subject to a 180° peel test under varying temperature conditions. The results are shown in Table 6.

TABLE 6

| Bonding force | Example | | | Comparative |
|---|---|---|---|---|
| (kgf/25 mm) | 16 | 17 | 18 | Example |
| at 25° C. | 4.5 | 4.0 | 3.2 | 2.0 |
| at 70° C. | 4.2 | 3.9 | 2.5 | 0.2 |

Example 19

With 100 parts of an ethylene-vinyl acetate-glycidyl methacrylate copolymer (Bondfast 2A, Sumitomo Chemical K.K., vinyl acetate content 8%, glycidyl methacrylate content 3%) were mixed 2.0 parts of benzoyl isopropyl ether, 0.5 part of γ-methacryloxypropyltrimethoxysilane (KBM 503, Shin-Etsu Silicone K.K.), and 2.0 parts of triallyl isocyanurate (TAIC, Nihon Chemicals K.K.). The mixture was homogeneously dissolved in toluene to form a solution having a resin concentration of 10% by weight. The solution was evenly coated onto a triacetate film by means of a roll coater and dried. The coated film was attached to a polycarbonate film under pressure while deaerating. Using a high-pressure mercury lamp of 4 kW, the film laminate was then exposed to UV for 30 seconds on each surface, 1 minute in total, obtaining a laminate A.

Example 20

A laminate B was prepared as in Example 19 except that glass was used instead of the polycarbonate film.

Example 21

A laminate C was prepared as in Example 19 except that a polyester film was used instead of the triacetate film and glass was used instead of the polycarbonate film.

The laminates of Examples 19–21 were subject to a 180° peel test under varying temperature conditions. The results are shown in Table 7.

TABLE 7

| Bonding force | Example | | | Comparative |
|---|---|---|---|---|
| (kgf/25 mm) | 19 | 20 | 21 | Example |
| at 25° C. | 4.2 | 4.0 | 3.2 | 2.0 |
| at 70° C. | 3.2 | 3.5 | 2.5 | 0.2 |

Example 22

With 100 parts of an ethylene-vinyl acetate-maleic anhydride copolymer (MODIC-E-100H, Mitsubishi Chemical K.K., vinyl acetate content about 20%, maleic anhydride content about 0.5%) were mixed 2.0 parts of benzoyl isopropyl ether, 0.5 part of γ-methacryloxypropyltrimethoxysilane (KBM 503, Shin-Etsu Silicone K.K.), and 1.0 part of triallyl isocyanurate (TAIC, Nihon Chemicals K.K.). The blend was milled in a roll mill at 80° C. and calendered into a film of 100 µm thick. The film was sandwiched between a triacetate film and a polycarbonate film. While deaerating in a vacuum bag, the sandwich was heated in an oven at 90° C. for achieving a pressure bond. Using a high-pressure mercury lamp of 4 kW, the sandwich was then exposed to UV for 30 seconds on each surface, 1 minute in total, obtaining a laminate A.

Example 23

A laminate B was prepared as in Example 22 except that glass was used instead of the polycarbonate film.

Example 24

A laminate C was prepared as in Example 22 except that a polyester film was used instead of the triacetate film and glass was used instead of the polycarbonate film.

The laminates of Examples 22–24 were subject to a 180° peel test under varying temperature conditions. The results are shown in Table 8.

TABLE 8

| Bonding force | Example | | | Comparative |
|---|---|---|---|---|
| (kgf/25 mm) | 22 | 23 | 24 | Example |
| at 25° C. | 4.5 | 4.0 | 3.2 | 2.0 |
| at 70° C. | 4.1 | 3.8 | 2.5 | 0.2 |

Example 25

With 100 parts of an ethylene-ethyl acrylate-maleic anhydride copolymer (LX4100, Sumitomo Chemical K.K., ethylene content 91%, ethyl acrylate content 8%, maleic anhydride content 1%) were mixed 2.0 parts of benzoyl isopropyl ether, 0.5 part of γ-methacryloxypropyltrimethoxysilane (KBM 503, Shin-Etsu Silicone K.K.), and 1.0 part of triallyl isocyanurate (TAIC, Nihon Chemicals K.K.). The blend was milled in a roll mill at 80° C. and calendered into a film of 100 µm thick. The film was sandwiched between a triacetate film and a polycarbonate film. While deaerating in a vacuum bag, the sandwich was heated in an oven at 90° C. for achieving a pressure bond. Using a high-pressure mercury lamp of 4 kW, the sandwich was then exposed to UV for 30 seconds on each surface, 1 minute in total, obtaining a laminate A.

Example 26

A laminate B was prepared as in Example 25 except that glass was used instead of the polycarbonate film.

Example 27

A laminate C was prepared as in Example 25 except that a polyester film was used instead of the triacetate film and glass was used instead of the polycarbonate film.

The laminates of Examples 25–27 were subject to a 180° peel test under varying temperature conditions. The results are shown in Table 9.

TABLE 9

| Bonding force | Example | | | Comparative |
|---|---|---|---|---|
| (kgf/25 mm) | 25 | 26 | 27 | Example |
| at 25° C. | 4.5 | 4.0 | 3.2 | 2.0 |
| at 70° C. | 4.1 | 3.8 | 2.5 | 0.2 |

Example 28

With 100 parts of an ethylene-methacrylic acid ionomer resin of sodium ion type (Himilan 1856, Mitsui duPont Polychemical K.K., methacrylic acid content 5%, degree of ionization by sodium ion 40%) were mixed 2.0 parts of benzoyl isopropyl ether, 0.5 part of γ-methacryloxypropyltrimethoxysilane (KBM 503, Shin-Etsu Silicone K.K.), and 1.0 part of triallyl isocyanurate (TAIC, Nihon Chemicals K.K.). The blend was milled in a roll mill at 80° C. and calendered into a film of 100 µm thick. The film was sandwiched between a triacetate film and a polycarbonate film. While deaerating in a vacuum bag, the sandwich was heated in an oven at 90° C. for achieving a pressure bond. Using a high-pressure mercury lamp of 4 kW, the sandwich was then exposed to UV for 30 seconds on each surface, 1 minute in total, obtaining a laminate A.

Example 29

A laminate B was prepared as in Example 28 except that glass was used instead of the polycarbonate film.

Example 30

A laminate C was prepared as in Example 28 except that a polyester film was used instead of the triacetate film and glass was used instead of the polycarbonate film.

The laminates of Examples 28–30 were subject to a 180° peel test under varying temperature conditions. The results are shown in Table 10.

TABLE 10

| Bonding force | Example | | | Comparative |
|---|---|---|---|---|
| (kgf/25 mm) | 28 | 29 | 30 | Example |
| at 25° C. | 4.5 | 4.0 | 3.2 | 2.0 |
| at 70° C. | 4.2 | 3.9 | 2.5 | 0.2 |

As is evident from the foregoing results, the laminate D using a pressure-sensitive acrylic adhesive experiences a substantial drop of bonding force as the temperature elevates. Then when such laminates on the surface are treated for alignment of liquid crystals, the laminates cannot withstand the heat, with a possibility of lifting and peeling at the joint interface. In contrast, laminates using the adhesive compositions of the invention do not collapse their integral structure even when treated at a high temperature of 70° C.

After the laminates were subject to a hot humid test (50° C./RH 95%/500 hr.), they were visually inspected for outer appearance. The laminates using the adhesive compositions of the invention were sound whereas in the laminate D using a pressure-sensitive acrylic adhesive, lifting due to bubbling was found at the joint interface.

Although some preferred embodiments have been described, many modifications and variations may be made thereto in the light of the above teachings. It is therefore to be understood that within the scope of the appended claims, the invention may be practiced otherwise than as specifically described.

We claim:

1. A liquid crystal display comprising; a liquid crystal cell comprising a substrate having a pair of major surfaces and a liquid crystal layer formed on one major surface of the substrate, with a transparent electrode and an orienting layer interposed therebetween, and a polarizer plate attached to the other major surface of the substrate, a thermosetting adhesive composition joining the polarizer plate to the substrate, comprising as a main component at least one polymer selected from the group consisting of an ethylene-vinyl acetate copolymer, a copolymer of ethylene, vinyl acetate, and an acrylate or methacrylate monomer, a copolymer of ethylene, vinyl acetate, and maleic acid or maleic anhydride, a copolymer of ethylene, an acrylate or methacrylate monomer, and maleic acid or maleic anhydride, and an ionomer resin in the form of an ethylene-methacrylic acid copolymer having a metal ion for binding molecules thereof, and further comprising 0.1 to 10 parts by weight of an organic peroxide and 0.01 to 5 parts by weight of a silane coupling agent per 100 parts by weight of said polymer.

2. The adhesive composition of claim 1, further comprising 0.1 to 50 parts by weight of at least one of an acryloxy group-containing compound, a methacryloxy group-containing compound, and an allyl group-containing compound per 100 parts by weight of said polymer.

3. The adhesive composition of claim 1, further comprising 1 to 200 parts by weight of a hydrocarbon resin per 100 parts by weight of said polymer.

4. The adhesive composition of claim 1 wherein said polymer is an ethylene-vinyl acetate copolymer having a vinyl acetate content of 10 to 50% by weight.

5. The adhesive composition of claim 1 wherein said polymer is a copolymer of ethylene, vinyl acetate, and an acrylate or methacrylate monomer, the copolymer having a vinyl acetate content of 10 to 50% by weight and an acrylate or methacrylate monomer content of 0.01 to 10% by weight.

6. The adhesive composition of claim 1 wherein said polymer is a copolymer of ethylene, vinyl acetate, and maleic acid or maleic anhydride, the copolymer having a vinyl acetate content of 10 to 50% by weight and a maleic acid or maleic anhydride content of 0.01 to 10% by weight.

7. The adhesive composition of claim 1 wherein said polymer is a copolymer of ethylene, an acrylate or methacrylate monomer, and maleic acid or maleic anhydride, the copolymer having an acrylate or methacrylate monomer content of 10 to 50% by weight and a maleic acid or maleic anhydride content of 0.01 to 10% by weight.

8. The adhesive composition of claim 1 wherein said polymer is an ionomer resin in the form of an ethylene-methacrylic acid copolymer having a metal ion for binding molecules thereof, the ionomer resin having a methacrylic acid content of 1 to 30% by weight and a degree of ionization by the metal ion of 5 to 80%.

9. A liquid crystal display comprising; a liquid crystal cell comprising a substrate having a pair of major surfaces and a liquid crystal layer formed on one major surface of the substrate, with a transparent electrode and an orienting layer interposed therebetween, and a polarizer plate attached to the other major surface of the substrate, a photo-curable adhesive composition joining the polarizer plate to the substrate, comprising as a main component at least one polymer selected from the group consisting of an ethylene-vinyl acetate copolymer, a copolymer of ethylene, vinyl acetate, and an acrylate or methacrylate monomer, a copolymer of ethylene, vinyl acetate, and maleic acid or maleic anhydride, a copolymer of ethylene, an acrylate or methacrylate monomer, and maleic acid or maleic anhydride, and an ionomer resin in the form of an ethylene-methacrylic acid copolymer having a metal ion for binding molecules thereof, and further comprising 0.1 to 10 parts by weight of a photosensitizer peroxide and 0.01 to 5 parts by weight of a silane coupling agent per 100 parts by weight of said polymer.

10. The adhesive composition of claim 9, further comprising 0.1 to 50 parts by weight of at least one of an acryloxy group-containing compound, a methacryloxy group-containing compound, and an allyl group-containing compound per 100 parts by weight of said polymer.

11. The adhesive composition of claim 9, further comprising 1 to 200 parts by weight of a hydrocarbon resin per 100 parts by weight of said polymer.

12. The adhesive composition of claim 9 wherein said polymer is an ethylene-vinyl acetate copolymer having a vinyl acetate content of 10 to 50% by weight.

13. The adhesive composition of claim 9 wherein said polymer is a copolymer of ethylene, vinyl acetate, and an acrylate or methacrylate monomer, the copolymer having a vinyl acetate content of 10 to 50% by weight and an acrylate or methacrylate monomer content of 0.01 to 10% by weight.

14. The adhesive composition of claim 9 wherein said polymer is a copolymer of ethylene, vinyl acetate, and maleic acid or maleic anhydride, the copolymer having a vinyl acetate content of 10 to 50% by weight and a maleic acid or maleic anhydride content of 0.01 to 10% by weight.

15. The adhesive composition of claim 9 wherein said polymer is a copolymer of ethylene, an acrylate or methacrylate monomer, and maleic acid or maleic anhydride, the copolymer having an acrylate or methacrylate monomer content of 10 to 50% by weight and a maleic acid or maleic anhydride content of 0.01 to 10% by weight.

16. The adhesive composition of claim 9 wherein said polymer is an ionomer resin in the form of an ethylene-methacrylic acid copolymer having a metal ion for binding molecules thereof, the ionomer resin having a methacrylic acid content of 1 to 30% by weight and a degree of ionization by the metal ion of 5 to 80%.

* * * * *